United States Patent
Sahin et al.

(10) Patent No.: US 8,489,031 B2
(45) Date of Patent: Jul. 16, 2013

(54) INTERFERER DETECTION AND INTERFERENCE REDUCTION FOR A WIRELESS COMMUNICATIONS NETWORK

(75) Inventors: Mustafa Emin Sahin, Ashburn, VA (US); Osama Tarraf, Leesburg, VA (US)

(73) Assignee: Reverb Networks, Inc., Ashburn, VA (US)

( * ) Notice: Subject to any disclaimer, the term of this patent is extended or adjusted under 35 U.S.C. 154(b) by 51 days.

(21) Appl. No.: 13/110,205

(22) Filed: May 18, 2011

(65) Prior Publication Data

US 2012/0295608 A1    Nov. 22, 2012

(51) Int. Cl.
*H04B 1/00*    (2006.01)

(52) U.S. Cl.
USPC ...................... 455/63.1; 455/67.13

(58) Field of Classification Search
USPC ... 455/63.1, 69, 423, 450, 453, 500; 370/201, 370/252, 318, 325, 328, 331–333, 336, 338
See application file for complete search history.

(56) References Cited

U.S. PATENT DOCUMENTS

| | | | |
|---|---|---|---|
| 2001/0046867 A1* | 11/2001 | Mizoguchi | 455/452 |
| 2002/0154614 A1* | 10/2002 | Jagger et al. | 370/332 |
| 2003/0040277 A1* | 2/2003 | Deats | 455/63 |
| 2004/0146093 A1* | 7/2004 | Olson et al. | 375/148 |
| 2004/0203426 A1* | 10/2004 | Cave et al. | 455/67.11 |
| 2005/0054367 A1* | 3/2005 | Larsson et al. | 455/525 |
| 2005/0111408 A1* | 5/2005 | Skillermark et al. | 370/331 |
| 2006/0209721 A1* | 9/2006 | Mese et al. | 370/254 |
| 2007/0042784 A1* | 2/2007 | Anderson | 455/450 |
| 2007/0058701 A1* | 3/2007 | Wang et al. | 375/152 |
| 2007/0111663 A1* | 5/2007 | Beyer et al. | 455/63.1 |
| 2008/0064432 A1* | 3/2008 | Park et al. | 455/522 |
| 2008/0096566 A1* | 4/2008 | Brunner et al. | 455/437 |
| 2008/0130582 A1* | 6/2008 | Lee et al. | 370/332 |

(Continued)

OTHER PUBLICATIONS

Office Action mailed Jan. 11, 2012 for U.S. Appl. No. 13/118,823, filed May 31, 2011.

(Continued)

*Primary Examiner* — Jinsong Hu
*Assistant Examiner* — Nathan Taylor

(57) ABSTRACT

An apparatus, system, method and program detect and reduce interference in cell sites of a wireless communications network. A cell site from the cell sites of the wireless communications network is selected and signal code power measurements from mobile devices in the cell site are received so that the sources of signals being transmitted to the mobile devices can be determined. Interfering sources are determined based on the signal code power measurements and the active set of sources for the mobile devices. The signal code power measurements are summed and ranked, and interfering transmitters associated with the ranked signal code power measurements for the interfering sources are determined. The same procedure is repeated for all cell sites of the wireless communications network, and the transmitter that is an interfering source for the highest number of cell sites is selected as a problem (interfering) transmitter. The parameters of the problem transmitter and the corresponding antenna are altered and performance of the wireless network in a critical zone around the problem transmitter and interference in the cell sites interfered by the problem transmitter are monitored. Altering of the parameters of the problem transmitter and the corresponding antenna is performed continuously until a desired interference reduction is achieved in the cell sites interfered by the problem transmitter.

23 Claims, 6 Drawing Sheets

U.S. PATENT DOCUMENTS

| | | | |
|---|---|---|---|
| 2009/0149134 A1* | 6/2009 | Gunnarsson et al. | 455/69 |
| 2009/0196162 A1* | 8/2009 | Sambhwani et al. | 370/201 |
| 2010/0020771 A1* | 1/2010 | Ji et al. | 370/336 |
| 2010/0087148 A1* | 4/2010 | Srinivasan et al. | 455/63.1 |
| 2010/0087149 A1* | 4/2010 | Srinivasan et al. | 455/63.1 |
| 2010/0190447 A1 | 7/2010 | Agrawal et al. | |
| 2010/0233962 A1* | 9/2010 | Johansson et al. | 455/63.1 |
| 2010/0323693 A1 | 12/2010 | Krishnamurthy et al. | |

OTHER PUBLICATIONS

Office Action mailed Nov. 15, 2011 for U.S. Appl. No. 13/118,771, filed May 31, 2011.

International Search Report and Written Opinion mailed Jan. 2, 2013 in PCT Application No. PCT/US12/38544.

* cited by examiner

Graph 1. Exemplary RSCP Values Measured By A Mobile Device.

Graph 2. Received Signal Powers Excluding Transmitters In The Active Set.

INTERFERER DETECTION AND INTERFERENCE REDUCTION FOR A WIRELESS COMMUNICATIONS NETWORK

BACKGROUND OF THE INVENTION

1. Field of the Invention

The present invention generally relates to planning and optimization of a universal mobile telecommunication system (UMTS) based network. In particular, the present invention relates to detecting and reducing interference from several transmitters in a UMTS network.

2. Description of the Related Art

Traditional network planning and optimization of a wireless network relies on static methodologies for finding site locations, dimensioning and configuring the radio resources to meet specified traffic demand. Traditional network optimization methods find the best configuration(s) of the wireless network to maximize the performance, which typically starts with an already working wireless network, followed by analysis and calculations done by engineers using software and hardware tools with extensive simulations of the network. Once a better configuration is determined, the new configuration is manually implemented.

However, manual network optimization consumes a large amount of human resources and is a lengthy process that is performed only when needed or periodically. Therefore, usage of network resource is not maximized, quality of service is degraded and end users or customer satisfaction is reduced.

Additionally, UMTS based wireless networks offer soft handover features that allow a mobile station (MS) to be served by multiple transmitters. The transmitters that serve the MS simultaneously constitute the active set for that MS. However, signals received by the MS that are not sent by the transmitters in the active set are considered interference signals.

Existence of interfering transmitters may lead to reduced network performance by reducing the number useful signals received by mobile stations. Moreover, interfering transmitters may cause pilot pollution, which is a phenomenon that occurs when there are too many potential serving cells to choose from.

Therefore, it would be useful to implement an automated system for network planning and optimization that also reduces interference and maximizes overall network performance.

SUMMARY OF THE INVENTION

An embodiment of the invention is directed to a method for detecting and reducing interference in cell sites of a wireless communications network that includes selecting a cell site of cell sites in a wireless communications network, wherein the cell site is a region in which wireless communications are provided to mobile devices; receiving signal code power measurements from the mobile devices in the selected cell site; and determining sources of signals being transmitted to the mobile devices based on the signal code power measurements. The method also includes generating a list of sources providing signals to the mobile devices in the cell sites and then removing sources included in an active set for each mobile device thereby creating a list of interfering sources. The interfering sources are sources not assigned to provide wireless communication services to a mobile device in the selected cell site, but whose source signal is still being received by the mobile device.

The signal code power measurements for the sources on the list of interfering sources are summed and ranked, and a list of interfering transmitters associated with the ranked signal code power measurements for the interfering sources is generated. The selecting, receiving, determining, generating of the list of sources, modifying, summing, ranking, and generating of the list of interfering transmitters, are repeated for each of the cell sites of the wireless communications network. The list of interfering transmitters includes transmitters that have the highest interference power as measured by the mobile devices, transmitters that cause interference in the highest number of mobile devices, transmitters that cause interference in the highest number of cells, or transmitters with a highest weight metric assigned. An interfering (problem) transmitter from the list of interfering transmitters is selected as a transmitter in need of adjustment, and a critical zone with respect to the interfering transmitter is determined.

Once the problem transmitter is selected, parameters of the interfering transmitter and the associated antenna are altered, and performance of the wireless network in the critical zone and interference by signals being transmitted to the cell site from the interfering transmitter are monitored. The altered parameters include antenna tilt and transmit power of the interfering transmitter. Altering of the parameters of the interfering transmitter and the antenna is performed continuously until a desired interference reduction is achieved in the cell site of the wireless communications network. Additionally, the altering of the parameters can be performed for all the transmitters on the list of interfering transmitters.

An embodiment of the invention is directed to at least one program recorded on a non-transitory computer-readable storage medium for detecting and reducing interference in a cell site of a wireless network, wherein the at least one program causes a computer to perform an interferer detection and interference reduction method as described in the previous embodiment.

An embodiment of the invention is also directed to a system for detecting and reducing interference in cell sites of a wireless network, which includes a detection and interference reduction apparatus that monitors a cell site in a wireless network; an antenna adjustment apparatus that receives instructions for the detection and interference reduction apparatus for making adjustments to at least one antenna transmitting signals to the cell site; and at least one controller configured to perform data communications with the detection and interference reduction apparatus for making adjustments to at least one transmitter.

The transmitter and antenna perform data communication with mobile devices distributed in a cell site, wherein the detection and interference reduction apparatus is configured to perform the interferer detection and interference reduction method discussed above in the previous embodiment.

An embodiment of the invention is directed to a detection and interference reduction apparatus for detecting and reducing interference in cell sites of a wireless network including a communication interface; at least one processor; and a memory. The memory stores at least one detection and interference reduction program for reducing interference in a cell site of a wireless network, wherein the at least one detection and interference reduction program causes the detection and interference apparatus to perform the interferer detection and interference reduction method discussed above in the previous embodiment.

BRIEF DESCRIPTION OF THE DRAWINGS

In the drawings, like reference numbers generally indicate identical, functionally similar and/or structurally similar elements. Embodiments of the invention will be described with reference to the accompanying drawings, wherein.

Figure 1:
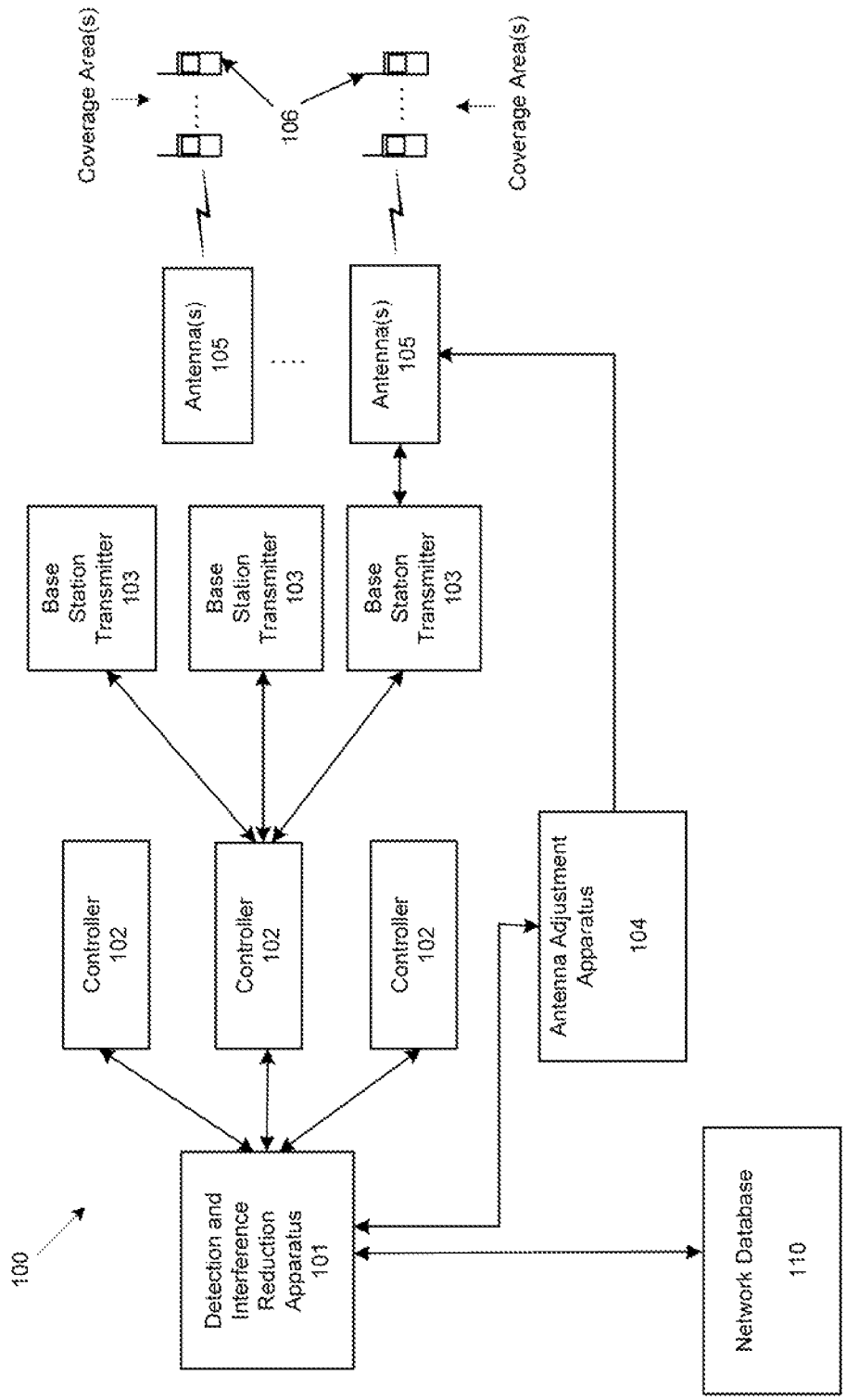
FIG. 1 illustrates a system for detecting and reducing interference in cell sites of a wireless communications network in accordance with an embodiment of the invention.

Additional features are described herein, and will be apparent from the following description of the figures.

DETAILED DESCRIPTION OF THE INVENTION

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

In the drawings accompanying the description that follows, often both reference numerals and legends (labels, text descriptions) may be used to identify elements. If legends are provided, they are intended merely as an aid to the reader, and should not in any way be interpreted as limiting.

FIG. 1 is a system for detecting and reducing interference in cell sites of a wireless communications network in accordance with an embodiment of the invention. The wireless network 100 illustrated in FIG. 1 includes a detection and interference apparatus 101 And, the wireless network 100 refers to any type of computer network that is wireless, and is commonly associated with a telecommunications network whose interconnections are implemented without the use of wires such as with electromagnetic waves, such as radio waves or the like as a carrier. The basic components of the wireless network 100 include the detection and interference reduction apparatus 101; one or more controllers 102; one or more base station transmitters 103 (hereafter "transmitters 103") for supporting data communications between mobile devices 106 distributed throughout coverage areas (e.g., cell sites) provided by the wireless network 100 via antennas 105; a network database 110; and an antenna adjustment apparatus 104.

It should be understood by one of ordinary skill in the art that the connections between the detection and interference reduction apparatus 101 and the one or more network controllers 102, the antenna adjustment apparatus 104 and the network database 110 can be wireless, wired or a combination of wireless and wired. Similarly, it should be understood by one of ordinary skill in the art that the connections between the one or more controllers 102 and the one or more transmitters 103 can be wireless, wired or a combination of wireless and wired.

As seen in FIG. 1, the detection and interference reduction apparatus 101 receives network statistics and the current network configurations from the network database 110 related to the wireless communication system 100 for assisting in the monitoring and optimization performed. The network statistics may include, but are not limited to, key performance Indicators (KPIs). An example of KPIs include an interference power, successful call rate, call traffic and dropped calls rate, which is the ratio between the failed calls and the total number of calls requested. Another network statistic is the capacity of the network. Capacity can be measured by the total number of calls and/or the amount of delivered data in bits or the throughput (overall data rate) in case of data calls. Additionally, the detection and interference reduction apparatus 101 also receives information regarding the transmitters 103 and the antennas 105 from the antenna adjustment apparatus 104.

The wireless network 100 offers a soft handover feature that allows a mobile device 106 to be served by multiple transmitters 103. The transmitters 103 that serve mobile device 106 simultaneously constitute the active set for a mobile device 106, and there might be up to, for example, 3 transmitters 103 in an active set with one of the transmitters being the best server to the mobile device 106. Signals received by a mobile device 106 from a transmitter 103 that is not in the active set are considered interference signals from an interfering transmitter 103.

The detection and interference reduction apparatus 101 can be a server or other similar computer device capable of executing one or more algorithms for performing the detection and interference reduction in wireless network 100. A more detailed discussion of the structure of the detection and interference reduction apparatus 101 is noted below with reference to FIG. 4.

The controllers 102 illustrated in FIG. 1 control one or more of the transmitters 103 to affect performance in the corresponding coverage areas or cell sites provided by the transmitters 103 and antennas 105. Mobile devices 106 are distributed within the coverage areas or cell sites for participating in wireless data communications provided by the wireless network 100 via the transmitters 103 and the antennas 105. The mobile devices 106 include user equipment of various types such as fixed, mobile, and portable two way radios, cellular telephones, personal digital assistants (PDAs), or other wireless networking devices.

Each coverage area behaves as an independent cell site serving its own set of mobile devices 106. For fixed wireless systems, such as IEEE802.16-2004, each coverage area can be used by a single transmitter 103 or plurality of transmitters 103 operating each on a different frequency channel. For mobile systems, subscribers of a single coverage area are served by a single transmitter 103 that can be a single frequency channel for IEEE802.16e-2005 (or UMTS or 1x-EVDO Rev. B and C) or multiple frequency channels that can be supported by IEEE802.16m (or UMTS or 1xEVDO Rev. B and C).

As illustrated in FIG. 1, the antenna adjustment apparatus 104 is in direct communication with the detection and interference reduction apparatus 101 for sending information to and receiving information from the detection and interference reduction apparatus 101, which makes adjustments to the transmitters 103 and the antennas 105. The antenna adjustment apparatus 104 includes an algorithm that analyzes information received from the detection and interference reduction apparatus 101 and sends control signals to the antennas 105 for altering antenna parameters. The antenna adjustment apparatus 104 also sends information regarding the transmitters 103 and the antennas 105 to the detection and interference reduction apparatus 101. The detection and interference reduction apparatus 101 makes adjustments to the transmitters 103 via the controllers 102.

Figure 2:
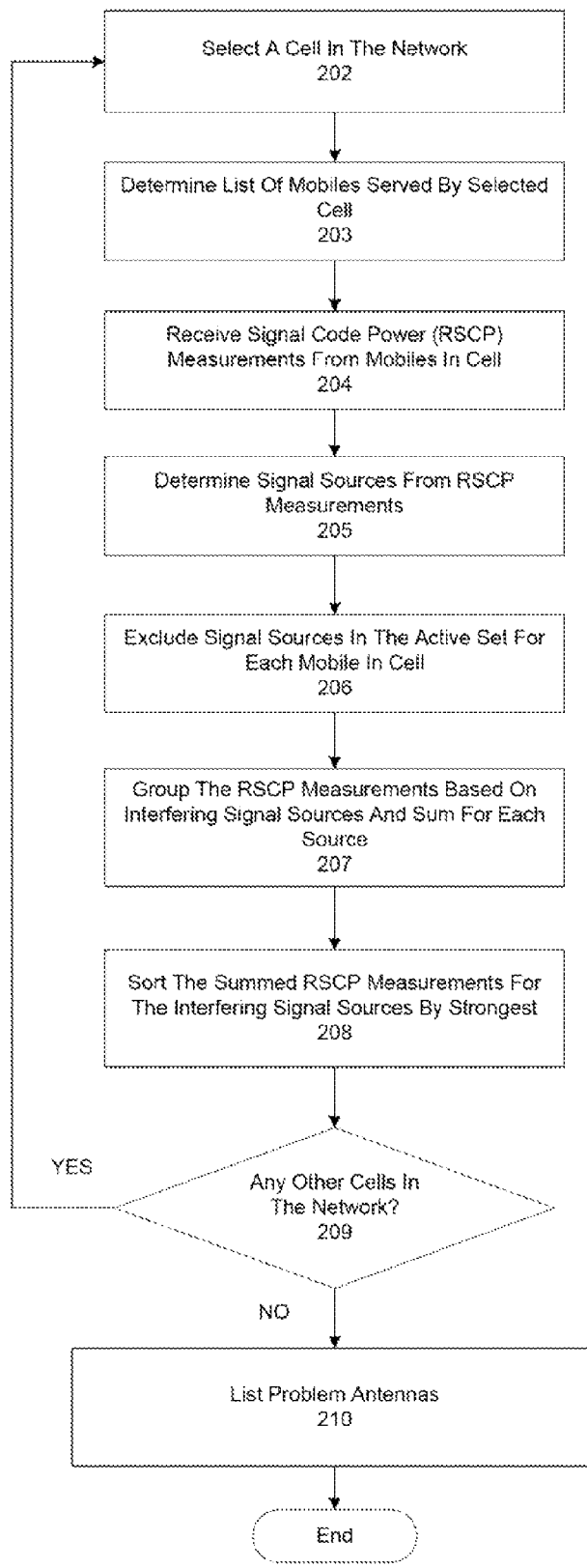
FIGS. 2 and 3 illustrate a method for detecting and reducing interference in cell sites of a wireless communications network in accordance with an embodiment of the invention.
Figure 3:
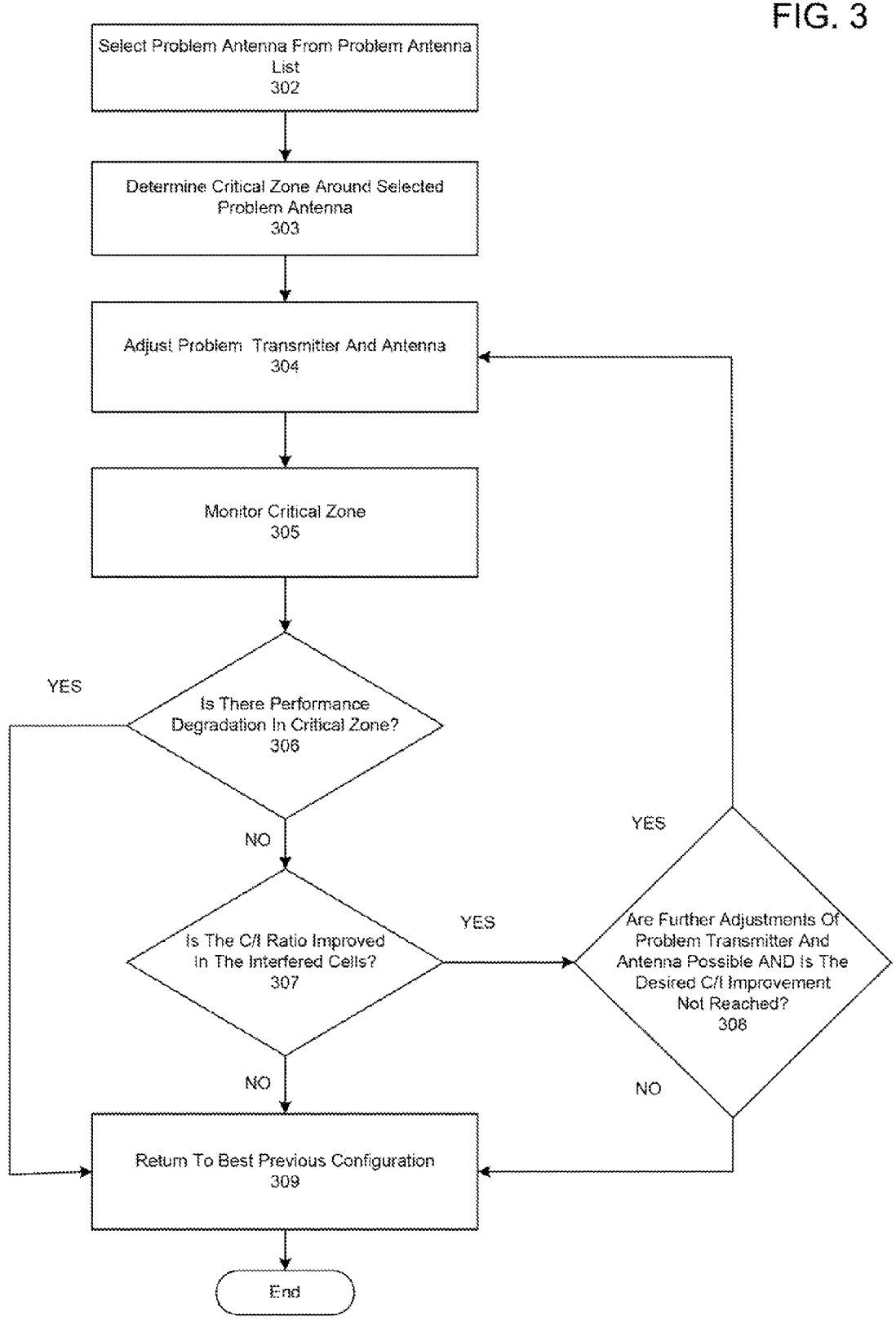

FIGS. 2 and 3 illustrate a method for detecting and reducing interference in cell sites of a wireless communications network in accordance with an embodiment of the invention. By way of example, the detection and interference reduction apparatus 101 can execute two separate algorithms; one for detecting interference caused by transmitters 103 and one algorithm for making modifications to parameters of interfering transmitters 103 and the antennas 105. However, the detection and interference reduction apparatus 101 can also execute one algorithm for detecting and reducing interference in cell sites of the wireless network 100 caused by the transmitters 103.

Figure 5:
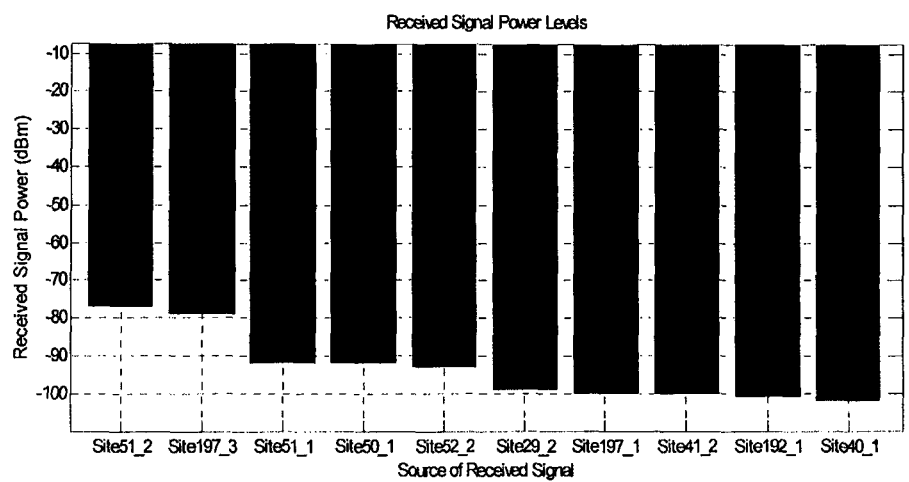
FIG. 5 is a graph illustrating exemplary RSCP values measured by a mobile device, according to an embodiment.

Referring now to FIG. 2, in step 202, the detection and interference reduction apparatus 101 selects a cell site in the wireless network 100 for detecting interference. The initial selection of the cell site may be based on network parameters received from the network database 110 or the antenna adjustment apparatus 104, or both. In step 203, the detection and interference reduction apparatus 101 determines a list mobile devices 106 served by the selected cell site. The list of mobile devices 106 in the cell site can be based on information regarding the cell site received from the network database 110 or the antenna adjustment apparatus 104. In step 204, the detection and interference reduction apparatus 101 acquires received signal code power (RSCP) values that are measured by the corresponding mobile devices 106 in the cell site. In step 205, the detection and interference reduction apparatus 101 determines the signal sources from the RSCP values measured. Exemplary RSCP values measured by a mobile device 106 are shown in FIG. 5.

In steps 206, the detection and interference reduction apparatus 101 excludes from the signal sources determined in step 205, the signal sources included in the active set for each mobile device 106 in the cell site. By excluding the signal sources in the active set, only the interfering signal sources or interfering power remain on a list of signal sources. An active set of signal sources are a set of sources assigned to provide source signals to a mobile device 106 in the cell site, whereas the interfering sources are sources not assigned to provide wireless communication services to a mobile device 106 in the cell site, but whose source signal is still being received by the mobile device 106 (i.e., interfering power).

Figure 6:
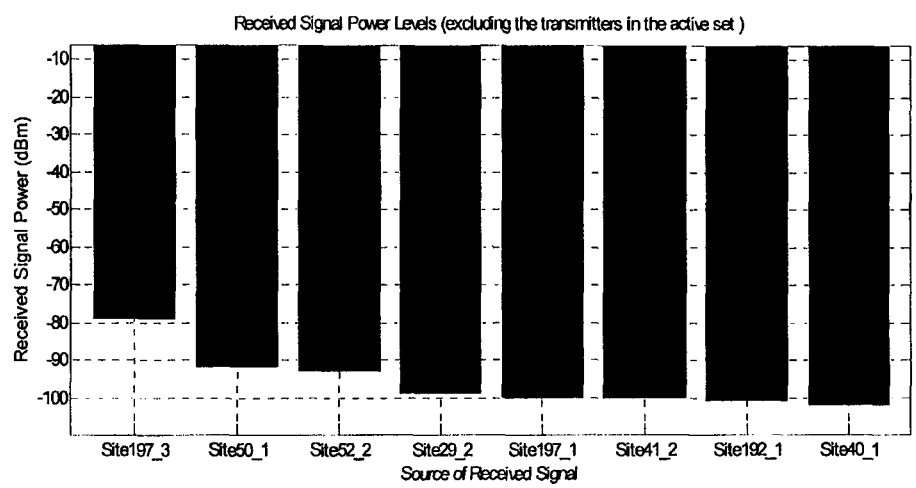
FIG. 6 is a graph illustrating exemplary received signal power levels excluding transmitters in an active set, according to an embodiment.

The list of interfering signal sources may include transmitters 103 that have the highest interference power as measured by the mobile devices 106, transmitters 103 that cause interference in the highest number of mobile devices 106, transmitters 103 that cause interference in the highest number of cells, or transmitters 103 with a highest weight metric assigned. A list of exemplary signals interfering signal sources (i.e., excluding signal sources in an active set) are provided in FIG. 6.

In step 207, the RSCP measurements for the interfering signal sources are grouped and summed for each of the signal sources. In step 208, the summed RSCP measurements are sorted for the interfering source signals by the strongest. The strongest signals are determined by the signal strength received by the mobile devices 106. In step 209, it is determined if there are any other cell sites in the network and, if not, a list of transmitters 103 associated with the list of interfering signal sources is generated. The list of transmitters 103 may be based on network configuration information received from the network database 110 or the antenna adjustment apparatus 104. The list of transmitters is considered to include transmitters 103 in need of adjustment by the detection and interference reduction apparatus 101 and the antenna adjustment apparatus 104. In step 209, if it is determined that there are other cells sites on the network, then another cell site is selected in step 202, and the process in steps 203-209 are repeated.

Exemplary Implementation

The following is an exemplary implementation of the selection of a problem transmitter 103 causing interference in the wireless network 100 with respect to seven mobile devices 106 (also referred to here as user equipment (UE)). After collecting the interfering source signals (as noted above in steps 202-206), the first five significant interfering signal sources are listed for all mobile devices 106 (e.g., UE1-UE7) in the currently selected cell. That is, the first five significant signal sources are generated by excluding the signal sources in the active set, so that only the interfering signal sources remain. As noted above, an active set of signal sources are a set of sources assigned to provide source signals to a mobile device 106 in the cell site, whereas the interfering sources are sources not assigned to provide wireless communication services to a mobile device 106 in the cell site, but whose source signals are still being received. For the purpose of this example, the interferers (e.g., Interferers I-V) refer to the interfering source signals. Table 1 below contains the interferers for seven mobile devices 106, and in Table 2, the corresponding interference powers are listed.

TABLE 1

Sources Of Interference For User Equipments (UE)

| | UE1 | UE2 | UE3 | UE4 | UE5 | UE6 | UE7 |
|---|---|---|---|---|---|---|---|
| Interferer I | 'Site161_3' | 'Site73_3' | 'Site73_3' | 'Site63_1' | 'Site161_3' | 'Site161_3' | 'Site73_3' |
| Interferer II | 'Site151_3' | 'Site161_3' | 'Site63_1' | 'Site64_2' | 'Site73_3' | 'Site63_1' | 'Site63_1' |
| Interferer III | 'Site73_3' | 'Site63_1' | 'Site172_2' | 'Site73_3' | 'Site63_1' | 'Site172_2' | 'Site64_2' |
| Interferer IV | 'Site75_3' | 'Site172_2' | 'Site161_3' | 'Site189_2' | 'Site73_1' | 'Site84_1' | 'Site172_2' |
| Interferer V | 'Site63_1' | 'Site64_2' | 'Site64_2' | 'Site151_3' | 'Site84_1' | 'Site64_2' | 'Site161_3' |

TABLE 2

Interference Levels (in dBm) For The UEs In

| | UE1 | UE2 | UE3 | UE4 | UE5 | UE6 | UE7 |
|---|---|---|---|---|---|---|---|
| Interferer I Power (dBm) | −90 | −87 | −80 | −87 | −89 | −90 | −91 |
| Interferer II Power (dBm) | −93 | −91 | −87 | −89 | −91 | −94 | −91 |
| Interferer III Power (dBm) | −96 | −93 | −92 | −91 | −95 | −95 | −91 |
| Interferer IV Power (dBm) | −96 | −94 | −96 | −98 | −96 | −97 | −91 |
| Interferer V Power (dBm) | −96 | −96 | −97 | −101 | −96 | −97 | −95 |

For the current cell, all sources of interference are identified using the table exemplified in Table 1. Then, the accumulated interference power is found for each of these interferers by simply adding the numbers (in mW) that belong to a specific interferer. These total interference values are sorted and the strongest three interferers, for example, are determined along with the corresponding values. In this example, the interferers that cause interference the most frequently are determined as being transmitted from a problem transmitter 103. However, the interferers can be determined based on interferers that have the highest interference power as measured by the mobile devices 106, interferers that cause interference in the highest number of mobile devices 106, interferers that cause interference in the highest number of cells, or interferers with the highest weight metric assigned. A list of transmitters corresponding to the list of problem interferers is generated. The list of transmitters is generated based on network configuration information received from the network database 110 or the antenna adjustment apparatus 104. The list of transmitters is considered to include transmitters 103 in need of adjustment by the detection and interference reduction apparatus 101 and the antenna adjustment apparatus 104.

Now referring to FIG. 3, in step 302, a problem (interfering) transmitter 103 is selected for the list of transmitters generated (i.e., in step 209) as a transmitter 103 in need for adjustment. In step 303, a critical zone is determined with respect to the selected cell site and the problem transmitter 103. The critical zone refers to a set of the neighbor cell sites in the vicinity of the selected cell site whose performance can be affected by performance in the selected cell site. The critical zone may contain direct neighbor cells sites of the selected cell site or additional levels of neighbor cell sites (i.e., indirect neighbor cell sites) with regard to the selected cell.

In step 304, the detection and interference reduction apparatus 101 makes adjustments to the selected problem transmitter 103 and the corresponding antenna 105 via the controller 102 and antenna adjustment apparatus 104, respectively. Adjustments can be made by altering the antenna parameters such as antenna tilt and transmit power of the transmitter 103. In step 305, after adjustments to the transmitter 103 and the corresponding antenna 105 are made, the performance in the critical zone is monitored by considered performance metrics in the critical zone. For example, the performance metrics can be based on dropped call rate (DCR), which has exceeded certain dropped call rate threshold over a certain observation window of time. An observation window is simply a specified time period such a number or days. The performance metric can also be calculated across specific time slots in different time frames. For example, Mondays to Fridays, Mondays only or Mondays to Fridays morning hours.

In step 306, if performance in the critical zone has degraded, then in step 309, the detection and interference reduction apparatus 101 returns to the best previous configuration of the transmitter 103 and the process ends. In step 306, if performance in the critical zone is not degraded, then in step 307, the average ratio of best server power to the interferer power (the average C/I ratio) measured by interfered mobile devices in the interfered cell sites is determined, where the best server power is the signal power of the best server and the interferer power is the signal power from the transmitter 103. In step 307, if it is determined that the average C/I ratio is improved, then in step 308 it is determined if further adjustments of the transmitter 103 and the antenna 105 are possible and if the improvement in the average C/I ratio has reached the desired level. If further adjustments of the transmitter 103 and the antenna 105 are possible and improvement in the average C/I ratio has not reached the desired level, then further adjustments are made to the transmitter parameters and the antenna parameters as in step 304. As noted above, adjustments are made by altering parameters such as antenna tilt and transmit power of the transmitter 103. However, in step 308, if it is determined that no further adjustments of the transmitter 103 and antenna 105 are possible or the improvement in the average C/I ratio has already reached the desired level, then the detection and interference reduction apparatus 101 returns to the best previous configuration of the transmitter 103 and the process ends. Similarly, in step 307, if it is determined that interference in the cell site is increased as a result of the initial adjustments to the transmitter 103, then the detection and interference reduction apparatus 101 returns to the best previous configuration of the transmitter 103 and the process ends.

As noted above, optimization of the wireless network 100 is performed by utilizing certain metrics considered during monitoring the performance of the wireless network (e.g., in steps 305-309) after making adjustments to a transmitter 103 and an antenna 105 (e.g., in step 304)

Exemplary metrics considered are as follows:
Change in the average best server power to the interferer power ratio (C/I)
Critical Zone average Successful Call Rate (SCR)
Critical Zone average traffic increase for all hours.
The change in the average C/I perceived by the mobiles in the interfered cells is calculated as follows:

$$C/I\_Change = Avg\_I/C\_Initial - Avg\_I/C$$

where
Avg_I/C=the mean of best server power to the interferer power ratio measured by the mobile devices in the interfered cells during the last n days (converted to dB)
Avg_I/C_Initial=the mean of best server power to the interferer power ratio measured by the mobile devices in the interfered cells during the initial n days (converted to dB).

The average SCR is calculated for the sum of all the services including voice, data and HSDPA calls as follows:

$$SCR = \frac{\text{Number of successful calls in the zone for the last } n \text{ days}}{\text{Number of total seizures in the zone for the last } n \text{ days}}$$

The average increase in the traffic of the critical zone over all hours is calculated as follows:

$$TrafficIncAllHours = \frac{\text{Traffic\_TotWin} - \text{Traffic\_IniTotWin}}{\text{Traffic\_IniTotWin}}$$

where,
Traffic_TotWin=Total zone traffic for the last observation window for all hours; and
Traffic_IniTotWin=Total zone traffic for the initial window for all hours.

As noted above, the interference reduction method described above with reference, in particular, to FIG. 3 will terminate in the following situations:
The average C/I ratio in the interfered cell sites decreases
Significant performance degradation is observed in the critical zone
The desired improvement in the average C/I ratio is obtained
Further downtilting of the problem antenna is not possible.
Optimization of the wireless network 100 is achieved by detecting and reducing interference from problem transmitters 103 and continually searching for better performance even if the performance is only slightly degraded. As a result, the best performance may occur anytime during the interference reduction process (e.g., in FIGS. 2 and 3). Performance values are recorded in the network database 110 after each modification to transmitter parameters. Additionally, modifications are made to the transmitter parameters to yield the best performance, even if the best performance is a previous operating condition of the wireless network 100.

Figure 4:
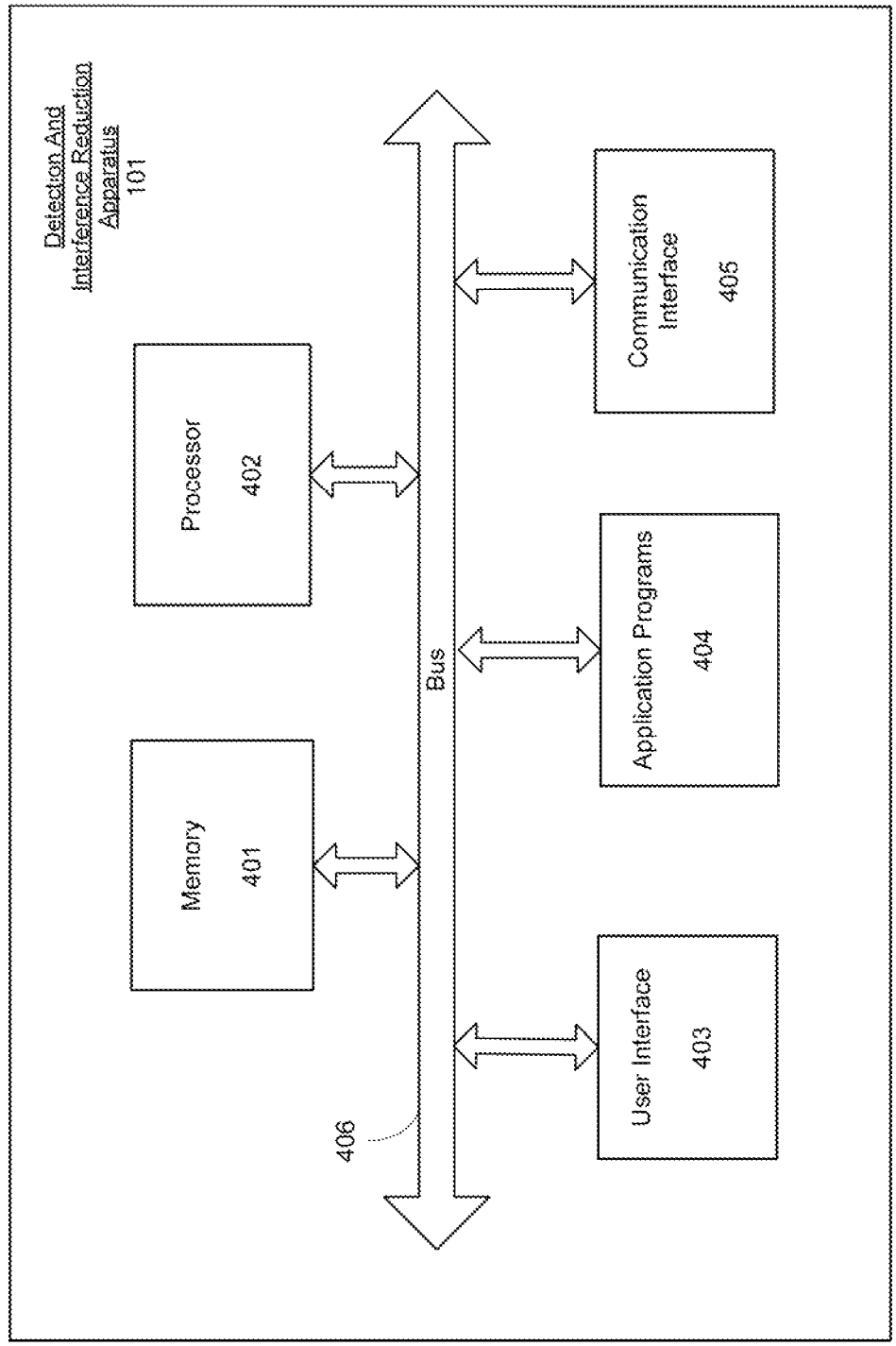
FIG. 4 illustrates an apparatus for detecting and reducing interference in cell sites of a wireless communications network in accordance with an embodiment of the invention.

FIG. 4 is a more detailed description of the detection and interference reduction apparatus 101 for performing the method of detecting and reducing interference in a selected cell site as described with reference to FIGS. 2 and 3. In FIG. 4, the detection and interference reduction apparatus 101 includes a memory 401, a processor 402, user interface 403, application programs 404, communication interface 405, and bus 406.

The memory 401 can be computer-readable storage medium used to store executable instructions, or computer program thereon. The memory 401 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program is also intended to include an algorithm that includes executable instructions stored in the memory 401 that are executable by one or more processors 402, which may be facilitated by one or more of the application programs 404. The application programs 404 may also include, but are not limited to, an operating system or any special computer program that manages the relationship between application software and any suitable variety of hardware that helps to make-up a computer system or computing environment of the detection and interference reduction apparatus 101. Additionally, the application programs 404 also include one or more interferer detection and interference reduction algorithms for performing the detecting and interference reduction method described with reference to FIGS. 2 and 3. The one or more interferer detection and interference reduction algorithms for performing the detecting and interference reduction method described with reference to FIGS. 2 and 3 can also be stored in memory 401. General communication between the components in the detection and interference reduction apparatus 101 is provided via the bus 406

The user interface 403 allows for interaction between a user and the detection and interference reduction apparatus 101. The user interface 403 may include a keypad, a keyboard, microphone, and/or speakers. The communication interface 405 provides for two-way data communications from the detection and interference reduction apparatus 101. By way of example, the communication interface 405 may be a digital subscriber line (DSL) card or modem, an integrated services digital network (ISDN) card, a cable modem, or a telephone modem to provide a data communication connection to a corresponding type of telephone line. As another example, communication interface 405 may be a local area network (LAN) card (e.g., for Ethernet™ or an Asynchronous Transfer Model (ATM) network) to provide a data communication connection to a compatible LAN.

Further, the communication interface 405 may also include peripheral interface devices, such as a Universal Serial Bus (USB) interface, a Personal Computer Memory Card International Association (PCMCIA) interface, and the like. The communication interface 405 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown).

From the description provided herein, those skilled in the art are readily able to combine software created as described with the appropriate general purpose or special purpose computer hardware for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

What is claimed is:

1. A method for detection and reducing interference in cell sites of a wireless communications network, the method comprising:

selecting a cell site from cell sites of a wireless communications network, the cell site being a region in which wireless communications are provided to mobile devices;

receiving signal code power measurements from the mobile devices in the cell site;

determining sources of signals being transmitted to the mobile devices in the cell site based on the signal code power measurements;

generating a list of sources providing signals to the mobile devices in the cell site;

modifying the list of sources by removing sources included in an active set for each mobile device thereby creating a list of interfering sources, the active set being a set of sources assigned to provide source signals to a mobile device in the cell site;

summing the signal code power measurements for the sources on the list of interfering sources;

ranking the summed signal code power measurements for the sources on the list of interfering sources from highest to lowest;

generating a list of interfering transmitters and corresponding antennas associated with the ranked signal code power measurements for the interfering sources;

repeating the selecting, the receiving, the determining, the generating of the list of sources, the modifying, the summing, the ranking, and the generating of the list of interfering transmitters for each of the cell sites of the wireless communications network;

selecting an interfering transmitter from the generated list of interfering transmitters for the cell sites of the wireless communications network and determining a critical zone with respect to the selected interfering transmitter selected; and altering parameters of the interfering transmitter and a corresponding antenna, and monitoring performance of the wireless network in the critical zone and interference by signals being transmitted to the cell site from the interfering transmitter, wherein the altering of the parameters of the interfering transmitter and the corresponding antenna is performed continuously until a desired interference reduction is achieved in the cell site of the wireless communications network.

2. The method of claim 1, wherein the monitoring of the performance in the critical zone and the monitoring of the interference by signals being transmitted to the cell site from the interfering transmitter are performed during an observation time period.

3. The method of claim 1, wherein the interfering sources are sources not assigned to provide wireless communication services to a mobile device in the cell site, but whose source signal is still being received by the mobile device.

4. The method of claim 1, further comprising:
returning to a best previous transmitter parameters when it is determined that performance in the critical zone has degraded or based on an amount of interference detected by the interfering transmitter in the cell site.

5. The method of claim 1, wherein the list of interfering transmitters includes transmitters that have a highest interference power as measured by the mobile devices, transmitters that cause interference in a highest number of mobile devices, transmitters that cause interference in a highest number of cells, or transmitters with a highest weight metric assigned.

6. The method of claim 1, wherein the parameters altered include antenna tilt and transmit power of the interfering transmitter.

7. The method of claim 1, wherein performance in the critical zone is based on key performance indicators (KPIs).

8. The method of claim 7, wherein in the KPIs include change in interference power, successful call rate or call traffic increases during the observation time period.

9. The method of claim 1, further comprising:
determining whether to alter a parameter of the interfering transmitter based on a change in the average ratio of best server power to interferer power (C/I).

10. The method of claim 1, wherein the altering of the parameters is performed for all transmitters on the list of interfering transmitters until a desired interference reduction is achieved in the cell site of the wireless network.

11. At least one program recorded on a non-transitory computer-readable storage medium for detecting and reducing interference in cell sites of a wireless network, the at least one program causing a computer to perform steps comprising:
selecting a cell site from cell sites of a wireless communications network, the cell site being a region in which wireless communications are provided to mobile devices;
receiving signal code power measurements from the mobile devices in the cell site;
determining sources of signals being transmitted to the mobile devices in the cell site based on the signal code power measurements;
generating a list of sources providing signals to the mobile devices in the cell site;
modifying the list of sources by removing sources included in an active set for each mobile device thereby creating a list of interfering sources, the active set being a set of sources assigned to provide source signals to a mobile device in the cell site;
summing the signal code power measurements for the sources on the list of interfering sources;
ranking the summed signal code power measurements for the sources on the list of interfering sources from highest to lowest;
generating a list of interfering transmitters and corresponding antennas associated with the ranked signal code power measurements for the interfering sources;
repeating the selecting, the receiving, the determining, the generating of the list of sources, the modifying, the summing, the ranking, and the generating of the list of interfering transmitters for each of the cell sites of the wireless communications network;
selecting an interfering transmitter from the generated list of interfering transmitters for the cell sites of the wireless communications network and determining a critical zone with respect to the selected interfering transmitter; and
altering parameters of the interfering transmitter and a corresponding antenna, and monitoring performance of the wireless network in the critical zone and interference by signals being transmitted to the cell site from the interfering transmitter,
wherein the altering of the parameters of the interfering transmitter and the corresponding antenna is performed continuously until a desired interference reduction is achieved in the cell site of the wireless communications network.

12. The at least one program of claim 11, wherein the monitoring of the performance in the critical zone and the monitoring of the interference by signals being transmitted to the cell site from the interfering transmitter are performed during an observation time period.

13. The at least one program of claim 11, wherein the interfering sources are sources not assigned to provide wireless communication services to a mobile device in the cell site, but whose source signal is still being received by the mobile device.

14. The at least one program of claim 11, further comprising:
returning to best previous transmitter parameters when it is determined that performance in the critical zone has degraded or based on an amount of interference detected by the interfering transmitter in the cell site.

15. The at least one program of claim 11, wherein the list of interfering transmitters includes transmitters that have a highest interference power as measured by the mobile devices, transmitters that cause interference in a highest number of mobile devices, transmitters that cause interference in a highest number of cells, or transmitters with a highest weight metric assigned.

16. The at least one program of claim 11, wherein the parameters of the interfering transmitter that are altered include antenna tilt and transmit power corresponding to the interfering transmitter.

17. The at least one program of claim 11, wherein performance in the critical zone is based on key performance indicators (KPIs).

18. The at least one program of claim 17, wherein in the KPIs considered include change in interference power, successful call rate or call traffic increases during the observation time period.

19. The at least one program of claim 11, further comprising:
determining whether to alter a parameter of the interfering transmitter based on a change in a ratio of average best server power to interferer power (C/I).

20. The at least one program of claim 11, wherein the altering of the parameters is performed for all transmitters on the list of interfering transmitters until a desired interference reduction is achieved in the cell site of the wireless network.

21. A system for detecting and reducing interference in cell sites of a wireless network, the system comprising:
- a detection and interference reduction apparatus that monitors and makes adjustments to a cell site from cell sites of a wireless network;
- an antenna adjustment apparatus that receives instructions for the detection and interference reduction apparatus for making adjustments to at least one antenna transmitting signals to the cell site; and
- at least one controller configured to perform data communications with the detection and interference reduction apparatus for making adjustments to at least one transmitter,
- wherein the least one transmitter and antenna perform data communication with mobile devices distributed in the cell site, and the detection and interference reduction apparatus is configured to:
    - select the cell site in the wireless communications network, the cell site being a region in which wireless communications are provided to mobile devices;
    - receive signal code power measurements from the mobile devices in the cell site;
    - determine sources of signals being transmitted to the mobile devices in the cell site based on the signal code power measurements;
    - generate a list of sources providing signals to the mobile devices in the cell site;
    - modify the list of sources by removing sources included in an active set for each mobile device thereby creating a list of interfering sources, the active set being a set of sources assigned to provide source signals to a mobile device in the cell site;
    - sum the signal code power measurements for the sources on the list of interfering sources;
    - rank the summed signal code power measurements for the sources on the list of interfering sources from highest to lowest;
    - generate a list of interfering transmitters and corresponding antennas associated with the ranked signal code power measurements for the interfering sources;
    - repeat the selecting of the cell site, the receiving of the signal code power measurements, the determining of the sources, the generating of the list of sources, the modifying of the list of sources, the summing of the signal code power measurements, the ranking of the summed signal code power measurements, and the generating of the list of interfering transmitters for each of the cell sites of the wireless communications network;
    - select an interfering transmitter from the generated list of interfering transmitters for the cell sites of the wireless communications network and determining a critical zone with respect to the selected interfering transmitter; and
    - alter parameters of the interfering transmitter and a corresponding antenna, and monitoring performance of the wireless network in the critical zone and interference by signals being transmitted to the cell site from the interfering transmitter,
- wherein the altering of the parameters of the interfering transmitter and the corresponding antenna is performed continuously until a desired interference reduction is achieved in the cell site of the wireless communications network.

22. The system of claim 21, further comprising:
- a network database configured to store the target criteria, network topology and parameters, and network statistics regarding the wireless network.

23. A detection and interference reduction apparatus for detecting and reducing interference in cell sites of a wireless network, the apparatus comprising:
- a communication interface;
- at least one processor; and
- a memory, the memory storing at least one detection and interference reduction program for detection and reducing interference in cell sites of a wireless network, the at least one detection and interference reduction program causing the detection and interference apparatus to perform steps comprising:
    - selecting a cell site from the cell sites in the wireless communications network, the cell site being a region in which wireless communications are provided to mobile devices;
    - receiving signal code power measurements from the mobile devices in the cell site;
    - determining sources of signals being transmitted to the mobile devices in the cell site based on the signal code power measurements;
    - generating a list of sources providing signals to the mobile devices in the cell site;
    - modifying the list of sources by removing sources included in an active set for each mobile device thereby creating a list of interfering sources, the active set being a set of sources assigned to provide source signals to a mobile device in the cell site;
    - summing the signal code power measurements for the sources on the list of interfering sources;
    - ranking the summed signal code power measurements for the sources on the list of interfering sources from highest to lowest;
    - generating a list of interfering transmitters and corresponding antennas associated with the ranked signal code power measurements for the interfering sources;
    - repeating the selecting, the receiving, the determining, the generating of the list of sources, the modifying, the summing, the ranking, and the generating of the list of interfering transmitters for each of the cell sites of the wireless communications network;
    - selecting an interfering transmitter from the generated list of interfering transmitters for the cell sites of the wireless communications network and determining a critical zone with respect to the selected interfering transmitter; and
    - altering parameters of the interfering transmitter and a corresponding antenna, and monitoring performance of the wireless network in the critical zone and interference by signals being transmitted to the cell site from the interfering transmitter,
- wherein the altering of the parameters of the interfering transmitter and the corresponding antenna is performed continuously until a desired interference reduction is achieved in the cell site of the wireless communications network.

* * * * *